US008884883B2

(12) United States Patent
Benko et al.

(10) Patent No.: US 8,884,883 B2
(45) Date of Patent: Nov. 11, 2014

(54) PROJECTION OF GRAPHICAL OBJECTS ON INTERACTIVE IRREGULAR DISPLAYS

(75) Inventors: Hrvoje Benko, Seattle, WA (US); Andrew Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1284 days.

(21) Appl. No.: 12/122,745

(22) Filed: May 19, 2008

(65) Prior Publication Data

US 2009/0189917 A1      Jul. 30, 2009

Related U.S. Application Data

(60) Provisional application No. 61/023,434, filed on Jan. 25, 2008.

(51) Int. Cl.
*G06F 3/041* (2006.01)
*G09G 5/00* (2006.01)
*G03B 21/56* (2006.01)
*G06K 9/40* (2006.01)
*G06F 3/042* (2006.01)
*G06F 3/14* (2006.01)
*H04N 9/31* (2006.01)
*G09G 3/00* (2006.01)

(52) U.S. Cl.
CPC .......... *G06F 3/14* (2013.01); *G09G 2340/0407* (2013.01); *G09G 3/002* (2013.01); *G09G 2340/0464* (2013.01); *G06F 3/0425* (2013.01); *H04N 9/3185* (2013.01)
USPC ........... 345/173; 345/647; 345/175; 345/156; 359/451; 382/275

(58) Field of Classification Search
None
See application file for complete search history.

(56) References Cited

U.S. PATENT DOCUMENTS

| 4,311,468 A |   | 1/1982 | Kiel et al. |
| 4,645,459 A | * | 2/1987 | Graf et al. ........................ 434/43 |
| 5,315,692 A | * | 5/1994 | Hansen et al. ................ 345/419 |

(Continued)

FOREIGN PATENT DOCUMENTS

| EP | 1195637 A1 | 4/2002 |
| JP | 2002-532795 | 10/2002 |

(Continued)

OTHER PUBLICATIONS

Marchese, F. et al, A projected hemispherical display with a gestural interface, ACM SIGGRAPH 2006 Research posters, Jul. 30-Aug. 3, 2006, Boston, Massachusetts.*

(Continued)

*Primary Examiner* — Maurice L McDowell, Jr.
*Assistant Examiner* — Donna Ricks
(74) *Attorney, Agent, or Firm* — Dan Choi; Judy Yee; Micky Minhas

(57) ABSTRACT

A method for displaying images on a curved display surface is described herein. The method includes receiving a graphical object and distorting the graphical object at run-time such that an appearance of the graphical object on the curved display surface will be substantially similar regardless of a position of the graphical object on the curved display surface when viewed at a viewing axis that is approximately orthogonal to a plane that is tangential to the curved display surface at a center of the graphical object. The method may further include displaying the graphical object on the curved display surface.

20 Claims, 15 Drawing Sheets

(56) References Cited

U.S. PATENT DOCUMENTS

| | | | |
|---|---|---|---|
| 5,414,521 | A | 5/1995 | Ansley |
| 6,016,385 | A * | 1/2000 | Yee et al. .................. 700/245 |
| 6,124,685 | A | 9/2000 | Toriu et al. |
| 6,409,351 | B1 | 6/2002 | Ligon |
| 6,527,555 | B1 | 3/2003 | Storm |
| 6,756,966 | B2 | 6/2004 | Dirksen et al. |
| 6,773,262 | B1 | 8/2004 | Blum |
| 6,793,350 | B1 | 9/2004 | Raskar et al. |
| 8,066,378 | B2 * | 11/2011 | Lalley et al. ................ 353/10 |
| 2004/0184013 | A1 * | 9/2004 | Raskar et al. ............ 353/121 |
| 2006/0167990 | A1 * | 7/2006 | Tobiasen et al. .......... 709/204 |
| 2008/0088593 | A1 * | 4/2008 | Smoot ...................... 345/173 |
| 2009/0027622 | A1 * | 1/2009 | Lalley et al. ................ 353/28 |
| 2009/0059096 | A1 * | 3/2009 | Yamamoto et al. ........ 348/746 |

FOREIGN PATENT DOCUMENTS

| | | |
|---|---|---|
| JP | 2003009039 A | 1/2003 |
| JP | 2003-035933 A | 2/2003 |
| JP | 2005-099064 | 4/2005 |
| JP | 2006094458 A | 4/2006 |
| JP | 2006-184573 | 7/2006 |
| JP | 2001-021833 | 4/2013 |
| WO | 00/35200 A1 | 6/2000 |
| WO | 2007/136372 A1 | 11/2007 |

OTHER PUBLICATIONS

Chan et al., Gesture-based interaction for a magic crystal ball, Proceedings of the 2007 ACM symposium on Virtual reality software and technology, Nov. 5-7, 2007, Newport Beach, CA.*

Kettner, S., Madden, C. and Ziegler, R. (2004). Direct Rotational Interaction with a Spherical Projection. Creativity & Cognition Symposium on Interaction: Systems, Practice and Theory.*

Companje, R. et al., Globe4D: time-traveling with an interactive four-dimensional globe, Proceeding of the 14th annual ACM international conference on Multimedia, Oct. 23-27, 2006, Santa Barbara, CA, USA.*

Marchese, F. et al, CrystalDome: A projected hemispherical display with a gestural interface, Proceedings of the 11th International Conference Information Visualization, p. 734-742, Jul. 4-6, 2007.*

International Search Report and Written Opinion Recieved for PCT Application No. PCT/US2008/088124 mailed on Jun. 23, 2009, 11 pages.

Sphere: Multi-touch interactions on a Spherical Display, User Interface Software and Technology '08, Oct. 19-22, Hrvoje Benko, Andrew D. Wilson, Ravin Balakrishnan. http://www.dgp.toronto.edu/~ravin/papers/uist2008_sphere.pdf.

Visualizing Internet Traffic Data with Three-Dimensional Spherical Display, Proceedings of the 2005 Asia-Pacific Symposium on Information Visualization, vol. 45, 2005, Sydney, Australia, Ben Yip, Shea Goyette, Chris Madden. http://crpit.com/confpapers/CRPITV45Yip.pdf.

"European Search Report", Mailed Date: Dec. 21, 2010, Application No. EP/08871181, Filed Date: Dec. 20, 2010, pp. 11.

"Notice on the First Office Action (PCT Application in the National Phase)". Mailed Date: Aug. 26, 2011; Application No. 200880125597.5; Filed Date: Jul. 23, 2010. pp. 1-8.

"Notice on the Second Office Action (PCT Application in the National Phase)". Mailed Date: Feb. 13, 2012; Application No. 200880125597.5; Filed Date: Jul. 23, 2010. pp. 1-6.

"Communication pursuant to Article 94(3) EPC". Mailed Date: May 17, 2013; Application No. 08 871 181.7. pp. 1-5.

"Response to the Official Communication Dated May 17, 2013" Filed Date: Sep. 6, 2013; Application No. 08 871 181.7. pp. 1-16.

"Response to Notice of Rejection Mailed Jan. 18, 2013". Filed Date: Apr. 18, 2013; Japanese Patent Application No. 2010-544301, pp. 1-5.

"Notice of Final Rejection". Mailed Date: May 24, 2013; Japanese Patent Application No. 2010-544301, pp. 1-2.

"Response to Notice of Final Rejection Mailed May 24, 2013". Filed Date: Aug. 22, 2013; Japanese Patent Application No. 2010-544301, pp. 1-6.

Notice of Rejection, Mailed Jan. 18, 2013, Japanese Patent Application No. 2010-544301, pp. 1-4 (including translation).

Yip, et al., "Visualising Internet Traffic Data with Three-Dimensional Spherical Display", proceedings of the 2005 Asia-Pacific symposium on Information visualisation—vol. 45, Sydney, Australia, Year of Publication: 2005, pp. 153-158.

"Actuality Systems" http://www.siggraph.org/s2002/exhibition/detail/400.html, Jul. 23-25, 2002.

Kettner, et al., "Direct Rotational Interaction With a Spherical Projection", A Creativity and Cognition Symposium, 2004. 18 Pages.

Fuller, "The Geoscope", from Education Automation, 1962. http://www.vterrain.org/Misc/geoscope.html.

"Global Imagination", http://www.globalimagination.com/.

Companje, et al., "Globe4D, Time-Traveling with an Interactive Four-Dimensional Globe", MM'06, Oct. 23-27, 2006, Santa Barbara, California, USA. 2 Pages.

"iBall+" http://www.audiovisualizers.com/library/store/iball/iball.htm.

"OmniGlobe® Technology" ARC Science Simulations http://www.arcscience.com/systemDetails/omniTechnology.html.

"The OmniGlobe: A Self-Contained Spherical Display System" Emerging Technologies—SIGGRAPH 2003. http://www.siggraph.org/s2003/conference/etech/omniglobe.html.

"Science on a Sphere" http://sos.noaa.gov/.

Buckminster, "The Geoscope", Critical Path 1981. http://www.well.com/user/abs/geoscope.html.

Leary, "Video Projections on a Globe Make Planetary Data Click" Published: Jun. 13, 2006. http://www.nytimes.com/2006/06/13/science/13sphe.html?_r=4&adxnnl=1&oref=slogin&adxnnlx=1195256110-XUjoB4n89dZC5/zH5rkocQ&oref=slogin&oref=slogin.

"Videoglobe", http://www.videoinmotion.com/VideoGlobePage.htm.

Wu, et al., "Multi-Finger and Whole Hand Gestural Interaction Techniques for Multi-User Tabletop Displays." ACM UIST, Dated: 2003, pp. 193-202.

Chan, et al., "Gesture-based Interaction for a Magic Crystal Ball". 2007, ACM VRST. pp. 157-164.

Chen, et al., "Flexible Active-Matrix Electronic Ink Display", 2003. Nature 423. p. 136.

Dietz, et al., "DiamondTouch: A Multi-User Touch Technology", 2001, ACM UIST. pp. 219-226.

Fitzmaurice, et al., "Sentient data Access via a Diverse Society of Devices". 2003. ACM Queue. pp. 53-62.

Grossman, et al., "Multi-Finger Gestural Interaction with 3D Volumetric Displays", 2004. ACM UIST. pp. 61-70.

Grossman, et al., "The Design and Evaluation of Selection Techniques for 3D Volumetric Displays", 2006. ACM UIST. pp. 3-12.

Han, "Low-cost Multi-touch Sensing Through Frustrated Total Internal Reflection", 2005. ACM UIST. pp. 115-118.

Kruger, et al., "How People Use Orientation on Tables: Comprehension, Coordination and Communication", 2003, ACM SIGGROUP Conference on Supporting Group Work. pp. 369-378.

Liang, et al., "A Highly Interactive 3D Modeling System", 2004, Computers and Graphics. 18 (4). pp. 499-506.

Marchese, et al., "Projected Hemispherical Display with a Gestural Interface", 2006, ACM SIGGRAPH Research Posters.

Matsushita, et al., "HoloWall: Designing a Finger, Hand, Body, and Object Sensitive Wall", 1997, ACM UIST. pp. 209-210.

Morris, et al., "Beyond "Social Protocols": Multi-User Coordination Policies for Co-located Groupware". 2004. ACM CSCW, pp. 262-265.

PufferSphere by Pufferfish http://www.pufferfishdisplays.co.uk/.

Rekimoto, "SmartSkin: An Infrastructure for Free-hand Manipulation on Interactive Surfaces", 2002. ACM CHI. pp. 113-120.

Scott, et al., "Territoriality in Collaborative Tabletop Workspaces", 2004. ACM CSCW, pp. 294-303.

Shen, et al., "DiamondSpin: An Extensible Toolkit for Around-the-Table Interaction", ACM, CHI. pp. 167-174.

(56) References Cited

OTHER PUBLICATIONS

Shoemake, "Animating Rotation with Quaternion Curves", 1985. ACM SIGGGRAPH. pp. 245-253.

Shoemake, "ARCBALL: A User Interface for Specifying Three-Dimensional Orientation Using a Mouse", 1992. Graphics Interface. pp. 151-156.

Shibano, et al., "CyberDome: PC Clustered Hemi Spherical Immersive Projection Display", In Proc. of the 2003 International Conference on Artificial Reality and Telexistence (ICAT 2003), Tokyo, Japan, Dec. 3-5, 2003, pp. 1-7.

Yang, et al., "PixelFlex: A Reconfigurable Multi-Projector Display System", Proceedings of the conference on Visualization '01, Oct. 21-26, 2001, San Diego, California, 9 Pages.

Ushida, et al., "i-ball2: An Interaction Platform with a Crystal-ball-like Display for Multiple Users.", International Conference on Artificial Reality and Teleexistence, Dated: 2003.

Wilson, "TouchLight: An Imaging Touch Screen and Display for Gesture-Based Interaction.", ICMI Conference on Multimodal Interfaces, Dated: 2004, pp. 69-76.

Wilson, "PlayAnywhere: A Compact Tabletop Computer Vision System.", ACM UIST, Dated: 2005, pp. 83-92.

Reply to Notice of Rejection of Jan. 18, 2013, Japanese Patent Application No. 2010-544301, Filed Apr. 18, 2013, pp. 1-10 (including translation of claims).

Notice of Rejection of May 24, 2013, Japanese Patent Application No. 2010-544301, pp. 1-5 (including translation).

Reply to Notice of Rejection of May 24, 2013, Japanese Patent Application No. 2010-544301, Filed Aug. 22, 2013, pp. 1-10 (including translation of claims).

Notice of Refusal of Oct. 15, 2013, Japanese Patent Application No. 2010-544301, pp. 1-6 (including translation).

* cited by examiner

PROJECTION OF GRAPHICAL OBJECTS ON INTERACTIVE IRREGULAR DISPLAYS

RELATED APPLICATION

This application claims the benefit of U.S. Provisional Patent Application No. 61/023,434, filed on Jan. 25, 2008, and entitled "PROJECTION OF GRAPHICAL OBJECTS ON IRREGULAR DISPLAYS." The entirety of the aforementioned application is incorporated herein by reference.

BACKGROUND

Touch screen technology has advanced in recent years such that touch screen technology can be found in many consumer level devices and applications. For example, banking machines often include touch sensitive graphical user interfaces that allow users to select a function and an amount for withdrawal or deposit. In another example, personal data assistants use touch screen technology to allow users to select graphical icons on an interactive interface with the user of a stylus. In still yet another example, some laptop computers are equipped with touch screen technology that allow users to generate signatures, select applications, and perform other tasks with the use of a stylus.

The popularity of touch screen technology has increased due to ease of use, particularly for novice computer users. For instance, novice computer users may find it more intuitive to select a graphical icon by hand than to select the icon through use of various menus and a pointing and clicking mechanism, such as a mouse. In currently available systems users can select, move, modify, or perform other tasks on objects that are visible on a display screen by selecting such objects (e.g., with a stylus or their finger).

While touch screen technology has greatly advanced, limitations persist, particularly in connection with touch-screen applications that are designed to be used on an irregular display surface, such as a spherical display surface. For example, conventionally, application developers must consider how graphics, text, and/or the like will appear on an irregular display surface when designing an application. Accordingly, to facilitate user-interaction with objects displayed on an irregular display surface, such developers generate code for all possible positions of graphical objects on the irregular display surface to ensure that such objects are displayed in a manner that is aesthetically pleasing. This requires a considerable amount of development time and also requires significant computational expense when projecting images onto a display. An alternative is to develop very limited applications with "canned" image data, such that a touch-screen apparatus has limited interactive functionality.

SUMMARY

The following is a brief summary of subject matter that is described in greater detail herein. This summary is not intended to be limiting as to the scope of the claims.

Various technologies relating to interactive touch screen apparatuses are described in detail herein. For example, technologies relating to displaying graphical objects on an irregular display surface, wherein interactive multi-touch functionality is associated with the irregular display surface are described herein. In an example, interactive multi-touch functionality pertains to the ability of multiple members (e.g., fingers of multiple users) to interact with displayed objects on an irregular display surface. For instance, an irregular display surface may be curved, such as a substantially spherical display.

In accordance with an aspect described herein, one or more graphical objects may be desirably displayed on an irregular display surface of an apparatus that supports interactive multi-touch functionality. Such graphical objects can be pre-distorted at runtime such that the graphical objects appear to a user of the apparatus in an aesthetically pleasing manner. For instance, a graphical object can be distorted at runtime such that an appearance of the graphical object on the irregular display surface may be substantially similar to a user regardless of a position of the graphical object on the curved display surface. In a detailed example, the graphical object may include at least one line that is desirably displayed as a straight line. On a curved display surface, such as a spherical display surface, however, there are no straight lines. Therefore, the graphical object can be distorted at run-time such that the at least one line is displayed on the irregular surface such that it appears to be straight to a user whose viewing axis is approximately orthogonal to a tangential plane at the center of the displayed graphical object.

Various actions can be undertaken to perform the aforementioned pre-distortion. For instance, the graphical object can be received in its "natural" form, such that the graphical object has not yet been sampled. Therefore, an application developer need not be concerned with writing code relating to displaying graphical objects on the irregular (e.g., spherical) display depending on location of the graphical objects and location of a user. For example, a representation of a unit sphere can be generated in a computer-readable medium. A desired scale of the graphical object can be ascertained (e.g., scale of the graphical object with respect to the representation). The scaled graphical object may then be projected onto the representation at a pole of the representation (e.g., 0 degrees longitude, 180 degrees latitude), such that each pixel of the scaled graphical object is projected onto the representation. The representation may then be rotated until the graphical object is oriented as desired. Thereafter, the representation may be further rotated until the graphical object is at a desired position on the representation. Such representation with the graphical object projected thereon may be "flattened", such that the 3-dimensional representation and graphical object is placed on a two-dimensional projection image. The projection image may then be used to project the graphical object onto an irregular surface (e.g., a spherical surface).

Other aspects will be appreciated upon reading and understanding the attached figures and description.

DETAILED DESCRIPTION

Figure 1:
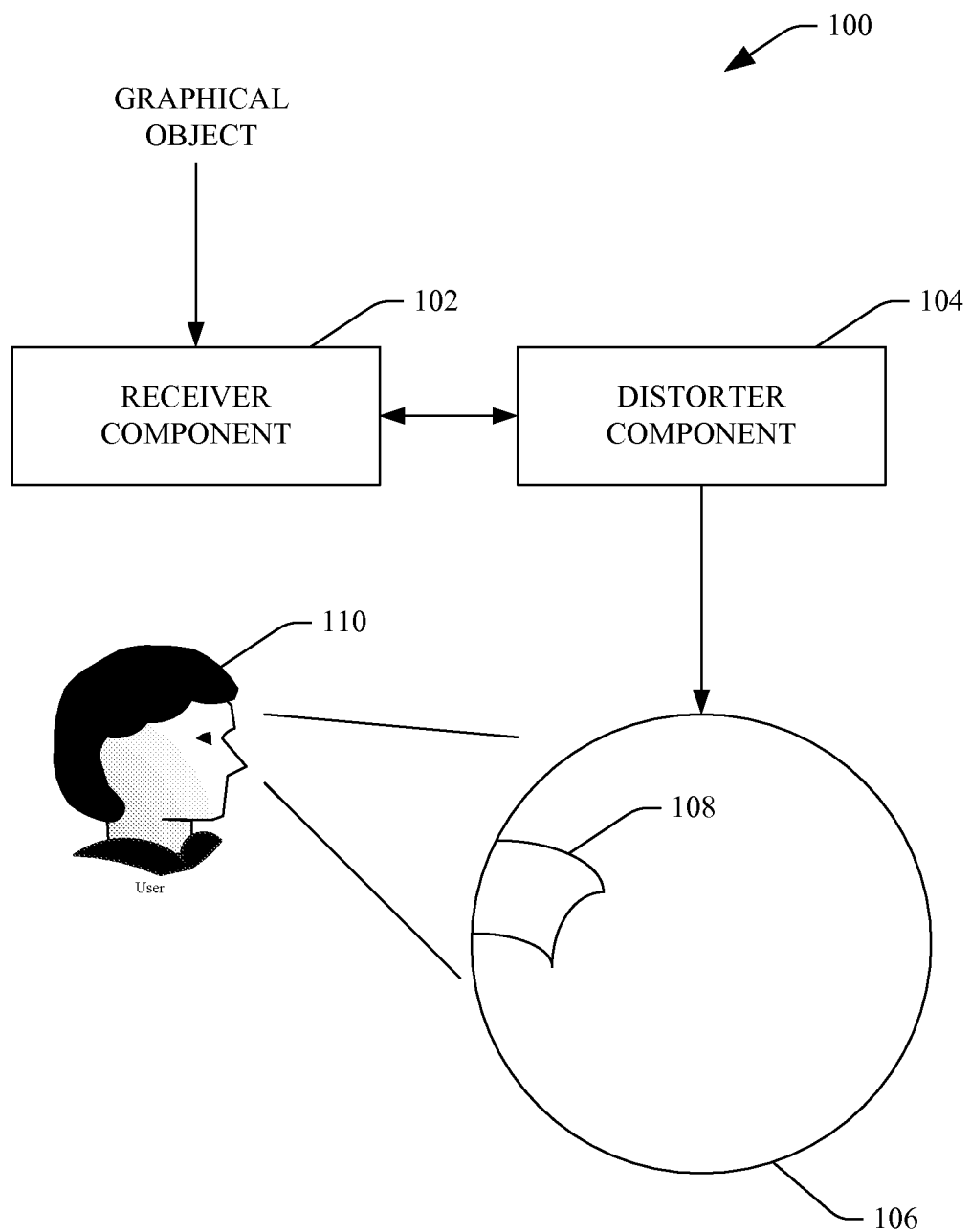
FIG. 1 is a functional block diagram of an example system that facilitates projecting a graphical object onto an irregularly shaped display surface.

Various technologies pertaining to displaying graphical objects on an irregular surface in a touch-screen environment (such as a multi-touch environment) will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates projecting images on an irregular display surface in an aesthetically pleasing manner is illustrated. The system 100 includes a receiver component 102 that receives a graphical object that is desirably displayed on an irregular display surface. Data upon which the graphical object is based may be in a natural (non-converted form). Pursuant to an example, the graphical object may be designed as if it will be displayed on a two-dimensional (regular) display. The graphical object may be a picture, a video, text, an icon, or other suitable graphical object.

A distorter component 104 receives the graphical object and distorts the graphical object at run-time of an application that is used in connection with displaying the graphical object. For instance, the application may be an application that facilitates display and movement of photographs on an irregular display surface in connection with multi-touch functionality. The distorter component 104 may distort the graphical object such that an appearance of the graphical object on an irregular display surface may be substantially similar to a user regardless of a position of the graphical object on the curved display surface when the viewing axis of the user is approximately orthogonal to a plane tangential to a viewing surface at the center of the graphical object. For instance, a graphical object may include at least one line that is desirably viewed as a straight line. The distorter component 104 may distort the graphical object such that the line appears straight to the user when the viewing axis of the user is approximately orthogonal to a plane that is tangential to the viewing surface at the center of the graphical object.

Pursuant to an example, an irregular display surface 106, which may be a curved display surface such as a substantially spherical display, can be used to display a photograph 108 to a user 110. While illustrated as being substantially spherical in nature, it is to be understood that the irregular display surface 106 may be any suitable curved display surface, including a portion of a sphere, parabolic surface, etc. The photograph 108 in its "natural" format may be rectangular in nature, and thus includes at least four straight lines. There may be, however, a lack of straight lines where the photograph 108 is desirably displayed on the irregular display surface 106. For instance, there are no straight lines on a spherical display surface. With appropriate distortion, however, the photograph 108 may appear to have four straight lines from a perspective of the user 110 (e.g., at approximately 90 degrees from a center of the photograph 108 on the irregular display surface 106), even though from a different perspective one can ascertain that such lines are, in fact, curved in nature. The distorter component 104 can perform such distortion without aid of an application being used to facilitate display of a graphical object. In other words, the application need not be coded specifically for display of the photograph 108 on an irregular display surface (e.g., the same application could be used in a multi-touch environment with a regular (flat) display surface).

Figure 2:
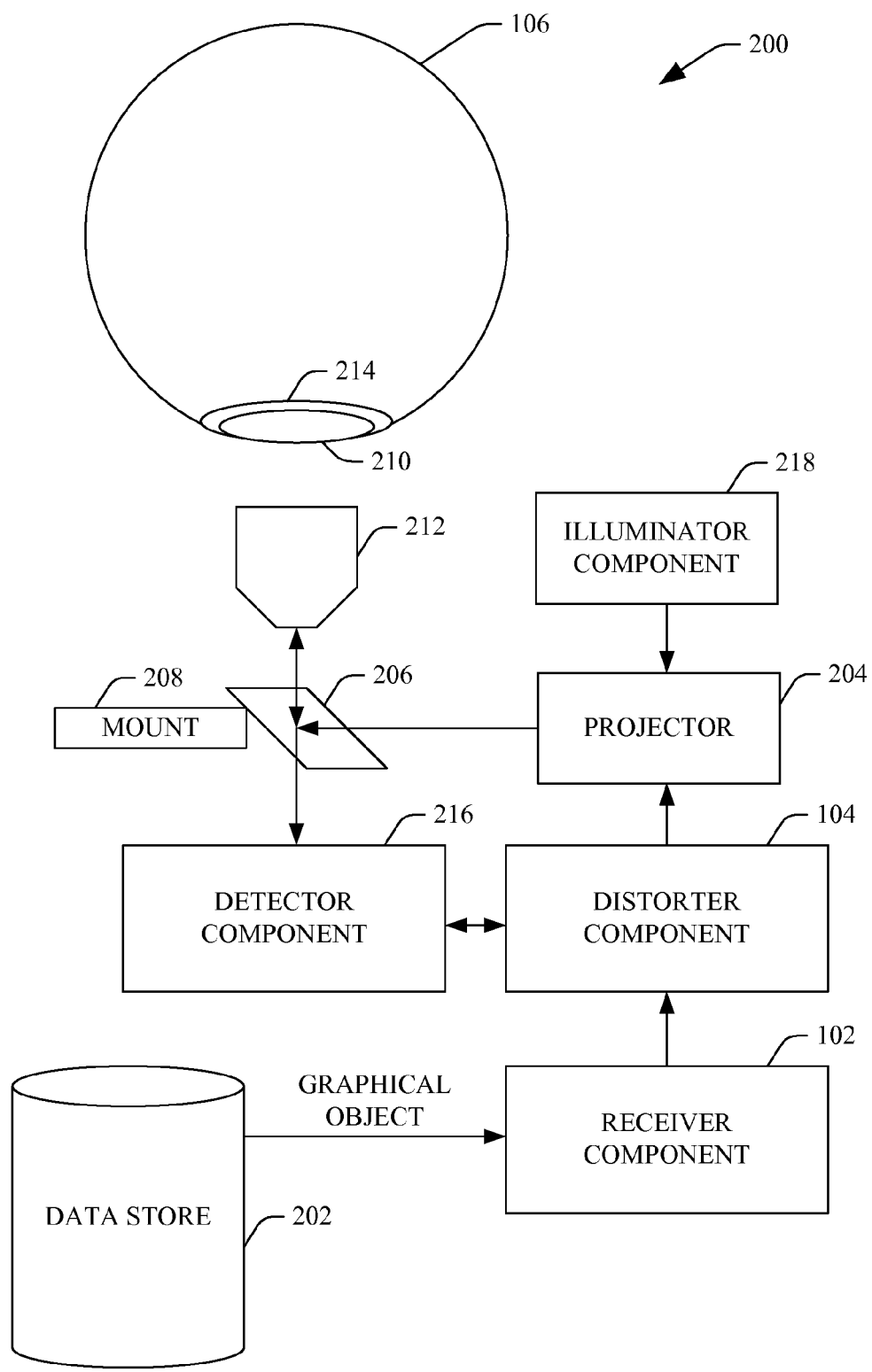
FIG. 2 is a functional block diagram of an example system that facilitates projecting a graphical object onto an irregularly shaped display surface.

Referring now to FIG. 2, an example system 200 that facilitates performance of multi-touch functionality with respect to an irregular display surface is illustrated. The system 200 includes a data store 202 that retains one or more graphical objects. For instance, the data store 202 may be memory, such as RAM, ROM, EEPROM, or the like. In another example, the data store 202 may be a hard drive. The receiver component 102 receives at least one graphical object from the data store 202. The distorter component 104 distorts the graphical object at run-time of an application that is used to display the graphical object, wherein the distortion is undertaken to display the graphical object in an aesthetically pleasing manner on the irregular display surface 106. Such distortion is described in greater detail below.

A projector 204 receives distorted images from the distorter component 104 and outputs the distorted images. As shown in detail infra, the distorted images can be projected from a projection disk that is used by the projector 204 to display graphical objects on the surface 106. In an example, a wavelength filter 206, such as a cold mirror, can be used to reflect light output by the projector 204. The wavelength filter 206 may be configured to allow non-visible light, such as infrared light, to pass therethrough. The wavelength filter 206 may be positioned by a mount 208, which may be a three-axis mount, for instance.

The display surface 106 may include an aperture 210, and a wide angle lens 212 may be positioned inside the aperture 210. The wide angle lens 212 receives light emitted from the projector 204, and thus projects images onto an exterior of the display surface 106 by way of an interior of the display surface 106. For instance, the display surface 106 may be diffuse in nature, allowing light that initially contacts the interior of the display surface 106 to be illuminated on the exterior of the display surface 106, such that a user can view images on the exterior of the display surface 106.

As noted above, the system 200 may be employed in a multi-touch environment. Accordingly, the system 200 includes components that facilitate detection of positions on the display surface 106 that a member, such as a finger or other object that can reflect infrared light, for example, is in physical contact with the display surface 106. Furthermore, the system 200 includes components that facilitate tracking a contact point (e.g., a finger on the display surface 106) as the contact point moves on the display surface 106. Specifically, the system 200 can include one or more light emitting diodes 214 that emit non-visible light (e.g., infrared light) through the display surface 106. The light emitting diodes 214 are positioned in a ring-like manner around the aperture 210 on the interior of the display surface 106. If a member is in physical contact with the display surface 106, light is reflected from the member and is received by way of the wide angle lens 212. The wavelength divider 206 allows non-visible light to pass through.

A detector component 216 captures images of non-visible light that passes through the wavelength filter 206. For instance, the detector component 216 can be or include an infrared camera. If a member is in contact with the display surface 106, an image captured by the detector component 216 will include a portion that corresponds to a level of brightness that is greater than other portions of the image. The detector component 216 can also track position of a contact point and provide such information to, for instance, the distorter component 104. Pursuant to an example, the detector component 216 can detect that a member is in contact with a portion of the display surface 106 that corresponds to a displayed graphical object, and the detector component 216 can further determine that the member is moving (thereby indicating that the graphical object is desirably moved). The distorter component 104 can appropriately distort the graphical object so that it is displayed in an aesthetically pleasing manner as the graphical object is moved about the display surface 106.

The system 200 may also include an illuminator component 218 that automatically orients graphical images on the display as graphical objects are rotated about the display (e.g., based upon user input detected by the detector component 216). The illuminator component 218 can automatically orient graphical objects such that the graphical objects are oriented in a substantially similar manner with respect to a pole of the display surface 106 regardless of position of the graphical objects on the display surface 106. For instance, a user may move a photograph from one side of the display surface 106 to another side of the display surface 106. The illuminator component 218 causes the photograph to remain oriented such that it is "right side up" with respect to a user on the other side of the display surface 106.

While the components in the system 200 are illustrated as being arranged in a particular manner, it is understood that other configurations of a display system are also contemplated. For instance, the projector 204 may be configured to project light onto the exterior of the display surface 106 (rather than the interior of the display surface 106 as shown). In such an example, the display surface 106 may not be specular in nature rather than diffuse. In another example, rather than using the wide-angle lens in connection with projecting images onto the display surface 106, one or more mirrors may be positioned on the interior of the display surface 106 to facilitate projecting images thereon. Other configurations are also contemplated by the inventors and are intended to fall under the scope of the hereto-appended claims.

Figure 3:
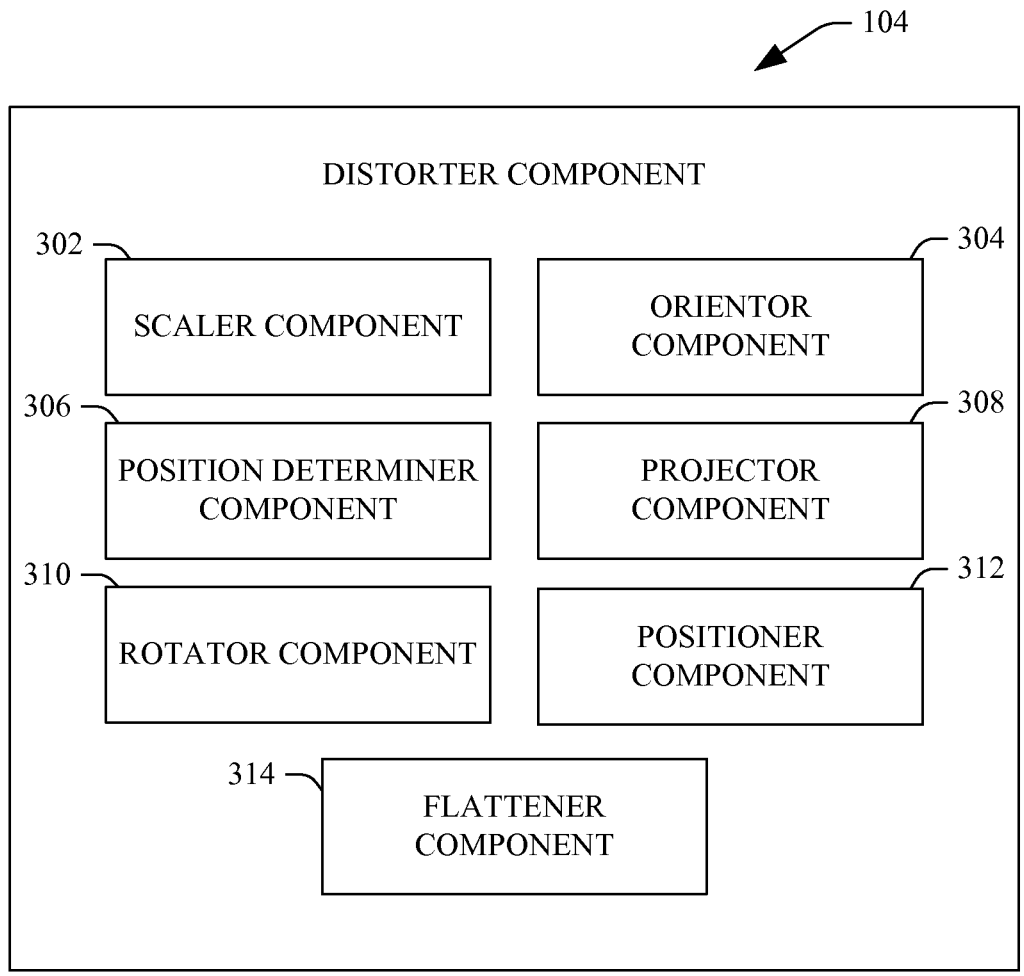
FIG. 3 is a functional block diagram of an example component that facilitates distorting a graphical object at run-time of an application that accesses the graphical object.

Now referring to FIG. 3, an example depiction of the distorter component 104 is illustrated. While shown as including numerous components, it is understood that the distorter component 104 may include more or fewer components than illustrated as being included in the distorter component 104. Furthermore, functionality described as corresponding to one component may be combined in one or more different components.

In an example, the distorter component 104 receives a graphical object that is desirably displayed on an irregular display surface. The distorter component 104 includes a scaler component 302 that determines a desired scale of the graphical object with respect to the irregular display surface. Pursuant to an example, the irregular display surface may be a substantially spherical display, and a representation of a sphere may be created and retained in memory. Such representation may be in Cartesian coordinates, polar coordinates, or other suitable coordinate system. Of course, representations of other irregular shapes may also be retained in memory. For instance, the representation may be a unit sphere, and the scaler component 302 can determine a desired scale of the graphical object with respect to the unit sphere.

An orientor component 304 determines a desired orientation of the graphical object on the unit sphere. For instance, the orientation may be an angle of rotation about a polar axis of the sphere. A position determiner component 306 determines a desired position of the graphical object on the unit sphere. For instance, the desired position may be expressed in latitude/longitude coordinates, Cartesian coordinates, or other suitable coordinate system.

The distorter component 104 may further include a projector component 308 that projects the graphical object (scaled in accordance with the determination of the scaler component 302) onto the unit sphere (e.g., data points of the scaled graphical object are projected onto the representation of the unit sphere). Such projection, for instance, may occur at a first pole of the unit sphere. The projection points may be retained in memory. A rotator component 310 may rotate the sphere until the graphical object is oriented as determined by the orientor component 304. In other words, the representation of the sphere is rotated in memory. A positioner component 312 may rotate the sphere about a second axis such that the graphical object is positioned as determined by the position determiner component 306. The sphere may then be re-oriented and the spherical representation and graphical object may be flattened, such that a two-dimensional representation results. The two dimensional representation may then be used to project the graphical object onto the spherical display.

As noted above, functionality of the components of the distorter component 104 may be altered if a display surface has a shape different than a sphere. For instance, a 3-dimensional representation of any suitable irregularly shaped display may be generated and used in connection with displaying images on an irregularly shaped display. Furthermore, a unit sphere may be used for ease of computation. It is understood, however, that the representation of a sphere may be of any suitable size.

Furthermore, it is to be understood that a graphical object can comprise multiple portions that make up the graphical object (e.g., a graphical object may be made up by a plurality of triangular objects). The distorter component 104 can perform the aforementioned distortions on each of the triangles in the graphical object in a continuous manner. Such distortion may also facilitate display of three-dimensional graphical objects on a substantially spherical display.

Figure 4:
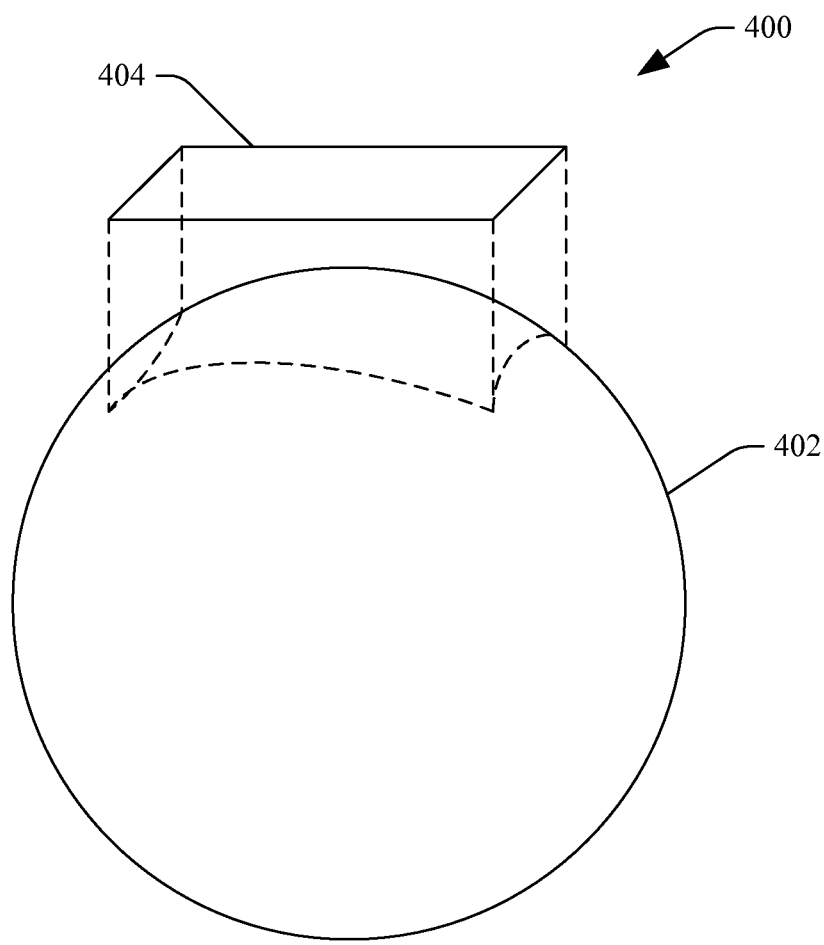
FIG. 4 is a depiction of an example projection of a planar graphical object onto a computer-implemented representation of a sphere.

Turning now to FIG. 4, an example 400 of a projection onto a representation of sphere (as undertaken by the projector component 308 of FIG. 3) is illustrated. A representation of a sphere 402 is retained in memory or other suitable storage. For instance, such representation may be a unit sphere that is represented by discrete points that correspond to pixels in a disk used to project graphical objects on a spherical display.

The sphere may be represented in memory using a Cartesian coordinate system. Alternatively, a polar coordinate system or other suitable coordinate system may be used. A graphical object 404 that is desirably displayed on a spherical display also resides in memory. The graphical object 404 is scaled/sheared to a desired size with respect to the sphere 402, and is projected onto the sphere. Such projection is illustrated by dotted lines. Pursuant to an example, each time a graphical object is projected it can be projected with respect to a pole of the sphere 402. The projection of the graphical object 404 may be retained in memory.

Figure 5:
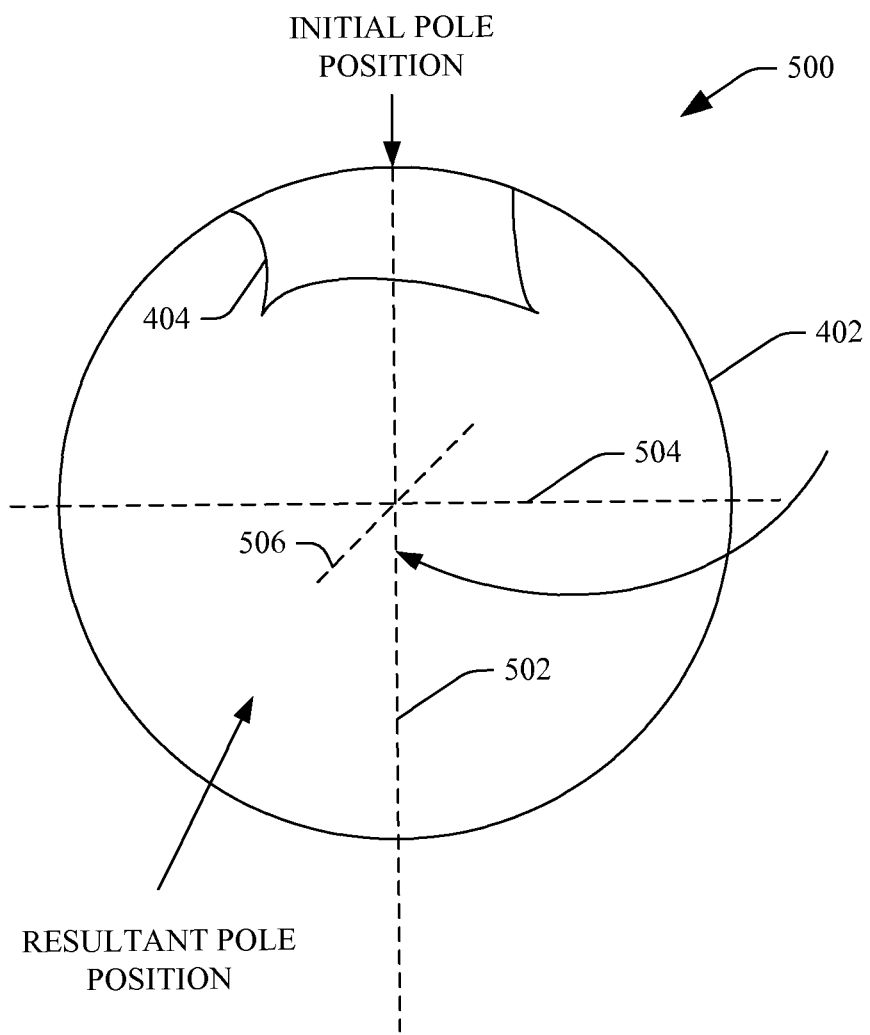
FIG. 5 is a depiction of an example rotation of a planar graphical object with respect to a computer-implemented representation of a sphere.

Referring now to FIG. 5, an example 500 that illustrates positioning of the graphical object 404 (as undertaken by the rotator component 310 and the positioned component 312) is depicted. As noted above, the graphical object 404 is projected onto a pole. The sphere 402 may be rotated about a polar axis 502 (e.g., a Y axis) until the graphical object 404 is oriented with respect to that axis as desired. The sphere 402 may then be rotated about a second axis 504 (e.g., an X axis 504) until the graphical object 404 is oriented as desired with respect to that axis. The sphere 402 may then be rotated about a third axis (e.g., a Z axis 506) until the graphical object 404 is positioned as desired on the sphere 402. For instance, the position of the graphical object 404 may not change in the data, while orientation of the sphere 402 changes to place the graphical object 404 in a desired position. As shown in FIG. 4, an initial position of the pole may exist at a first point and a final position of the pole may be at a much different point. One skilled in the art can ascertain how data can be manipulated to represent rotation of such sphere as well as correlate the graphical object 404 with the sphere. Once the desired position is ascertained, the sphere 402 can be re-oriented to place the pole in an initial position and the graphical object 404 in a desired position.

Figure 6:
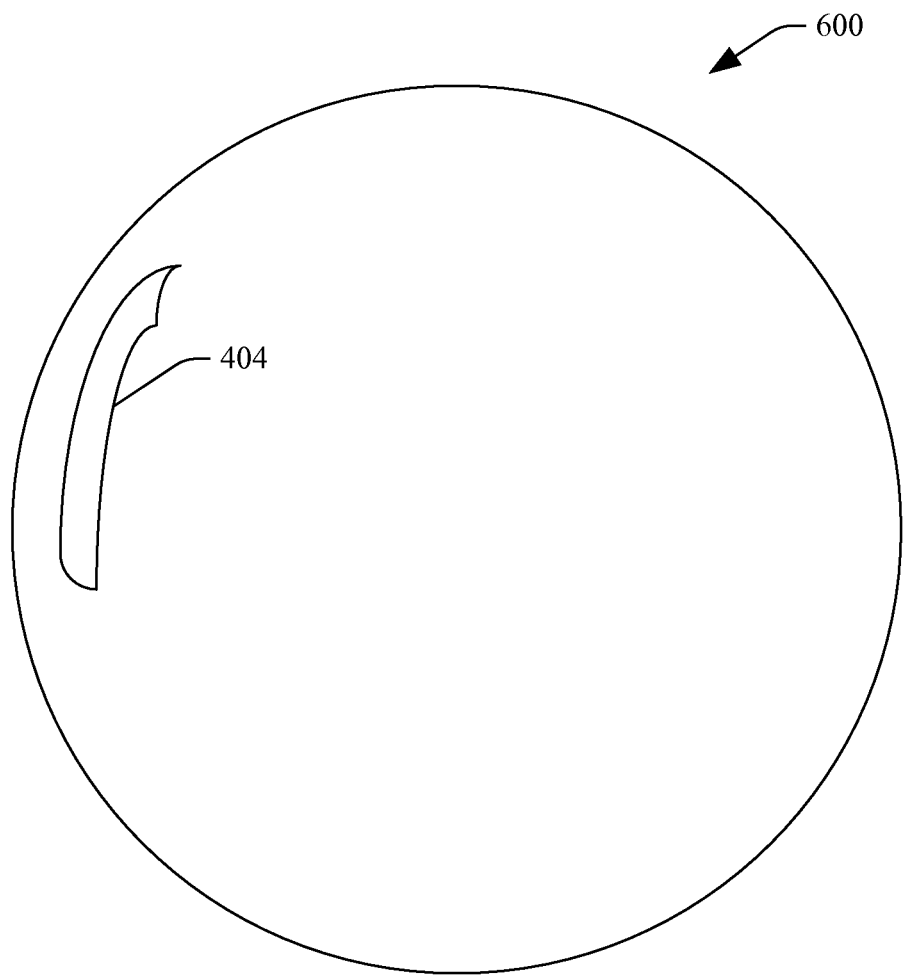
FIG. 6 is a depiction of an example mapping of a three-dimensional coordinate system of a computer-implemented representation of a sphere to a two-dimensional coordinate system used by a projector.

Turning now to FIG. 6, a disk 600 that is a flattened depiction of the sphere 402 (as undertaken by the flattener component 314) is illustrated. The three-dimensional representation of the sphere 402 and the graphical object 404 are flattened to create the disk 600, which includes a distortion of the graphical object 404. When the disk 602 is projected onto a spherical display, the graphical object 404 appears in an aesthetically pleasing manner to a user of the spherical display.

It is to be noted that the graphical object 404 need not be re-sampled multiple times to display the graphical object 404 on an irregular display surface. This is true even in an interactive environment. Moreover, in an interactive environment, as a graphical object is desirably moved on a spherical display, for instance, the graphical object need not be re-projected (e.g., by the projector component 308) unless such object is re-scaled. Furthermore, a dedicated 3D graphics system/framework can be used to perform operations described as being performed by the distorter component 104.

Figure 7:
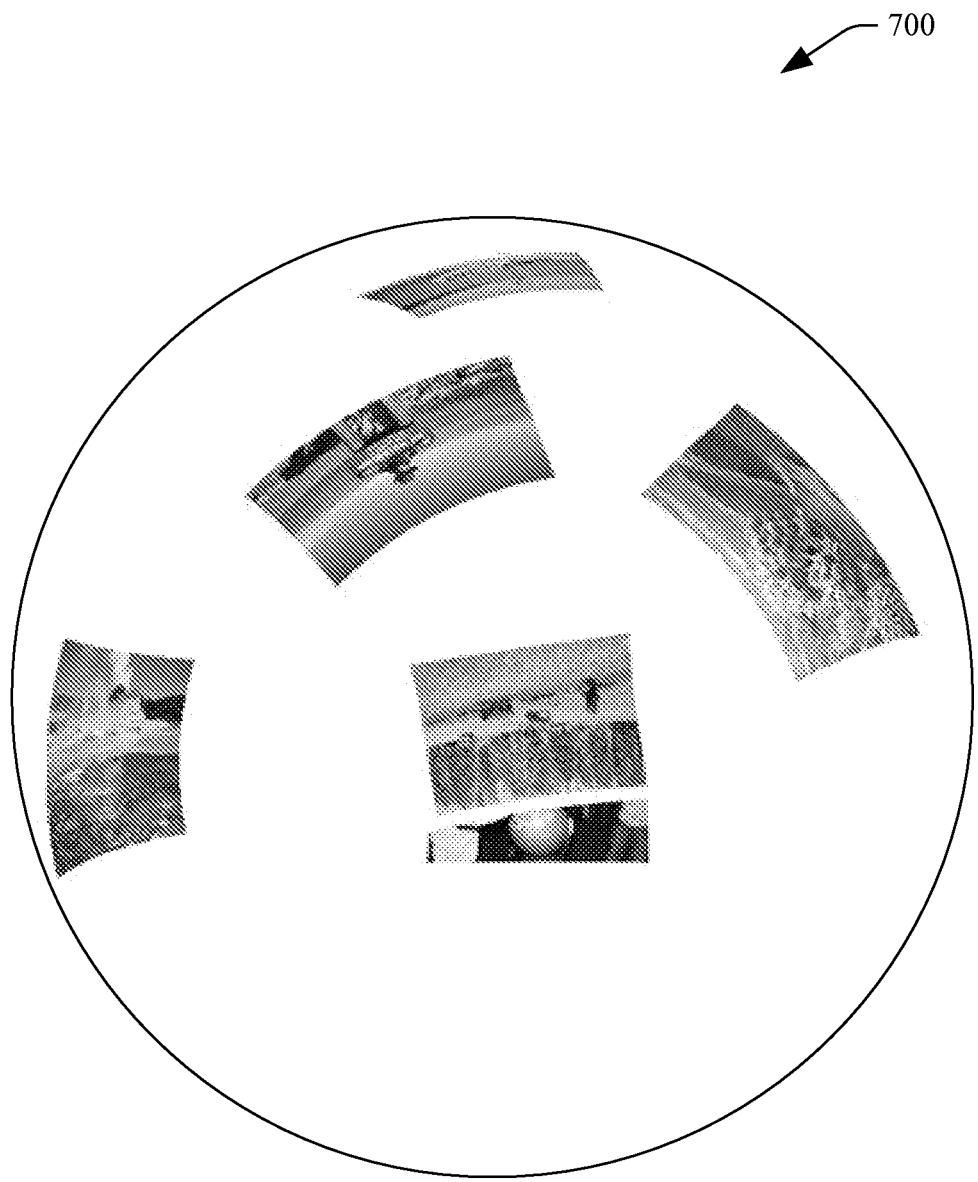
FIG. 7 is an example depiction of graphical objects that are to be displayed on a spherical display.

Referring now to FIG. 7, an example screenshot 700 of graphical objects on a disk that is used by a projector to project the graphical objects on a spherical display is illustrated. It can be discerned that various depicted graphical objects are distorted on the disk. When displayed on a spherical display, however, such graphical objects maintain their rectangular shape when viewed from a viewing axis that is approximately orthogonal to a tangential plane on a curved display surface at the center of a displayed graphical object.

Figure 8:
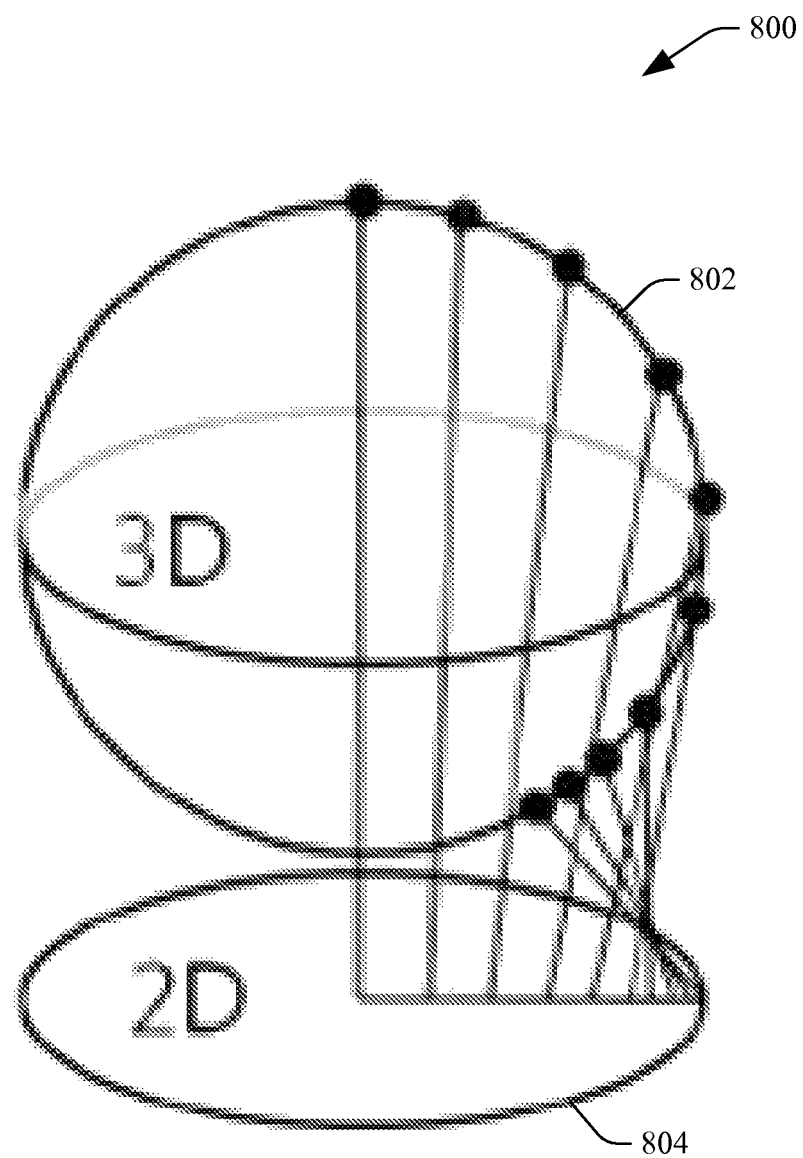
FIG. 8 is an example depiction of a mapping between a sphere and a two-dimensional disk.

Turning now to FIG. 8, an example mapping 800 between a representation of a sphere 802 and a two-dimensional disk 804 that is to be projected onto a spherical display is illustrated. For instance, projection of data in a three-dimensional coordinate system can be flattened into a flat radial image for a projector to project images through a wide angle lens. Specifically, a top of the sphere 802 maps to a center of the two-dimensional disk 804, and a distance from the center of the two-dimensional disk corresponds to a height of a point on the sphere 802. A mapping can be determined once and used subsequently for spherical displays of a substantially similar size.

Figure 9:
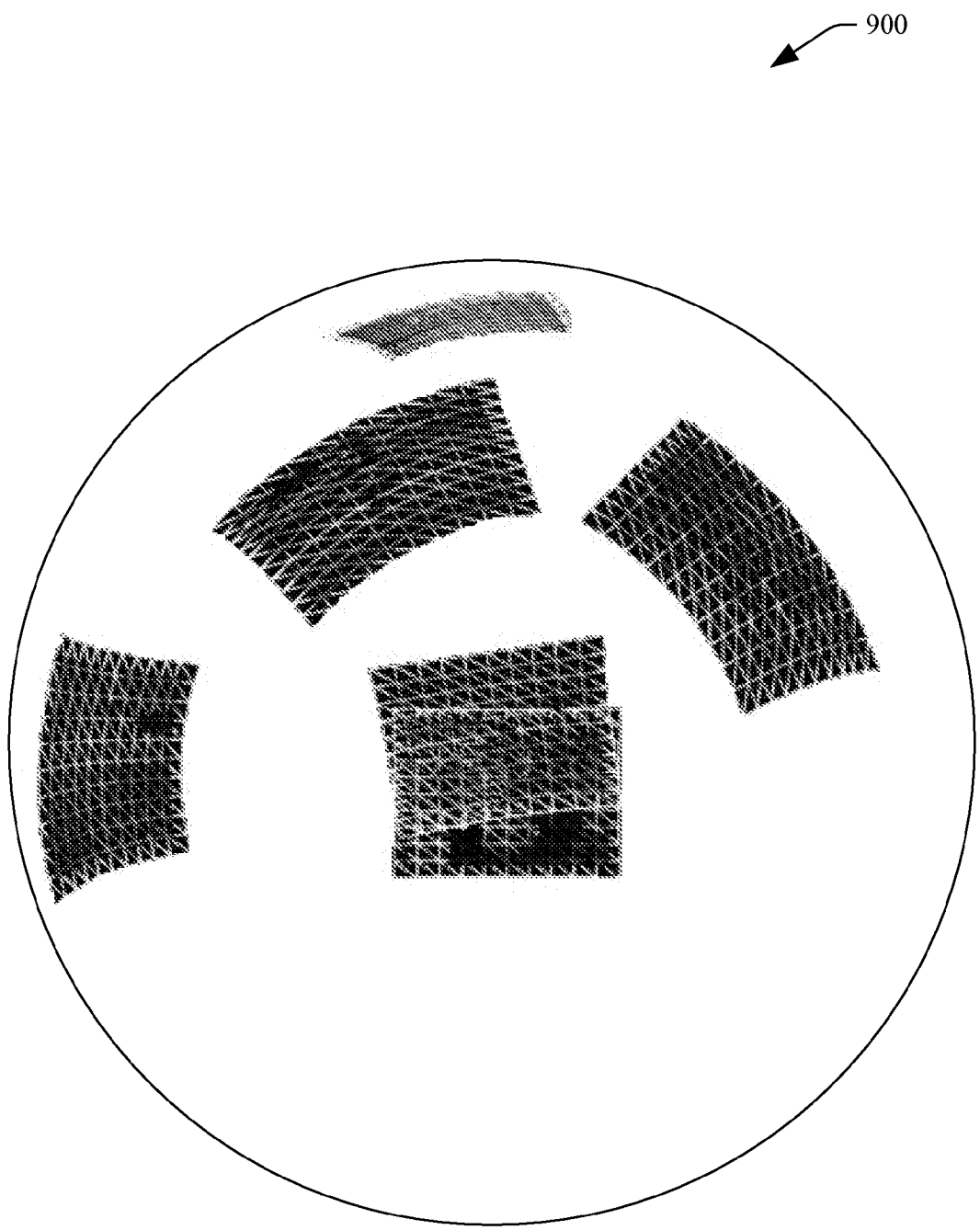
FIG. 9 is an example depiction of graphical objects that are to be displayed on a spherical display.

With reference now to FIG. 9, an example screenshot 900 of the graphical objects depicted in FIG. 7 is illustrated. It can be ascertained that the graphical objects are tessellated to facilitate displaying such images on the spherical display. More particularly, a vertex shader application can be used to compute a position of each vertex in a radial image at every frame. It is to be understood, however, that other mechanisms for displaying images on a curved (e.g., spherical) display are contemplated. Pursuant to an example, a pixel shader application may be utilized, wherein (instead of altering a position of triangular vertices), position of each pixel may be altered to display a graphical object. As noted above, the distorter component 104 (FIG. 1) can distort each triangular vertice of a graphical object in a continuous manner.

Content for display on a spherical display can be created using various data coordinate systems. For instance, a two-dimensional coordinate system of a projected radial disk image can be used for generating a background texture. In another example, as will be shown below, a cylindrical projection can be performed, where graphics are generated in a two-dimensional plane (a cylindrical map) and then mapped onto a sphere. In yet another example, content may be authored in three-dimensional Cartesian coordinates in which all graphical objects lie on a sphere (e.g., a unit sphere) centered at an origin. In still yet another example, a sphere at any given point may be considered flat, and thus a small portion of a graphical user interface may be designed in two-dimensions and then projected from a tangential plane to a point on a three-dimensional spherical surface.

Figure 10:
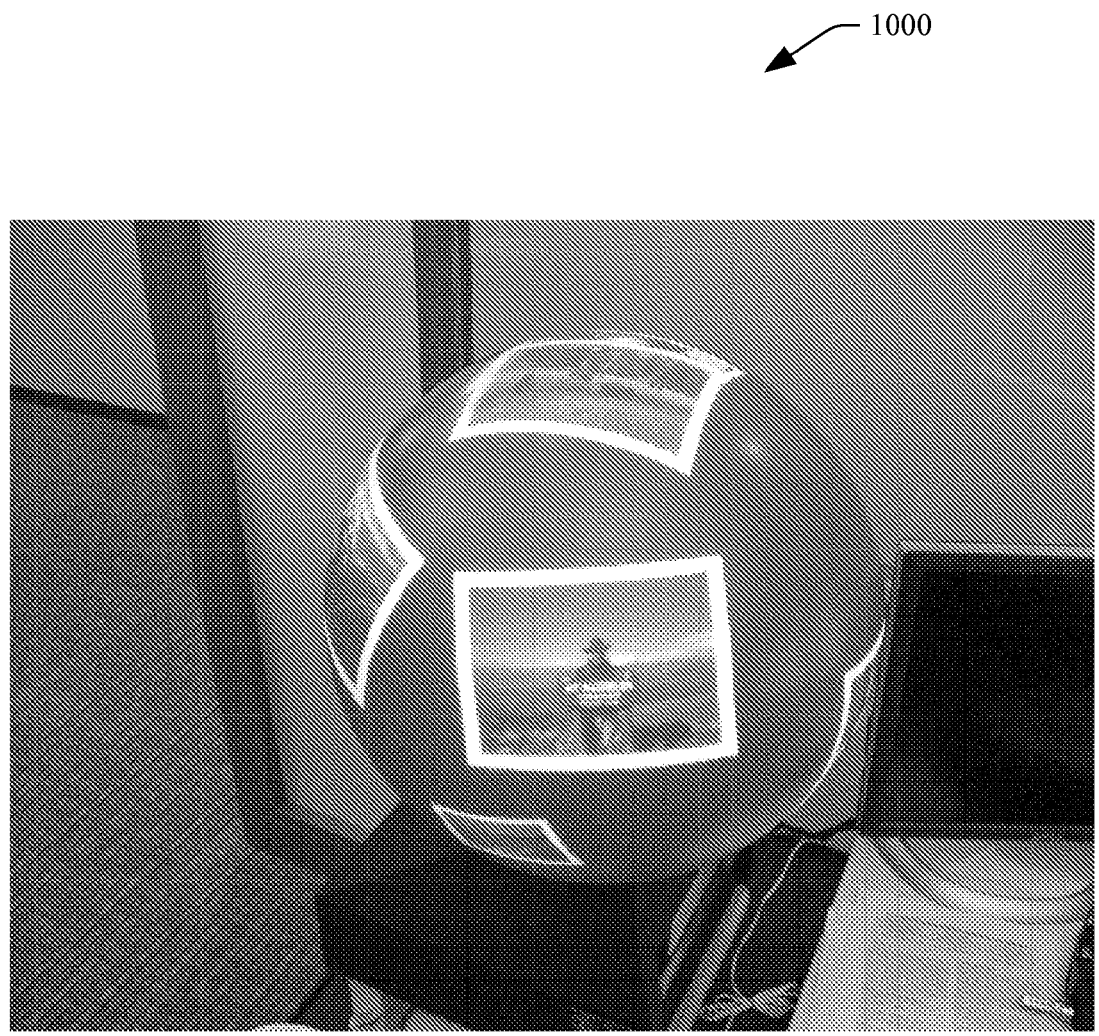
FIG. 10 is an example depiction of graphical objects displayed on a spherical display.

Now referring to FIG. 10, a photograph 1000 of an example spherical display that is displaying multiple graphical objects is illustrated. Such graphical objects are images that are desirably displayed as rectangles. The images are distorted such that lines appear to be straight when a viewing axis of a user viewing a graphical object is approximately orthogonal to a plane that is tangential to a curved display surface at a center of the graphical object.

Figure 11:
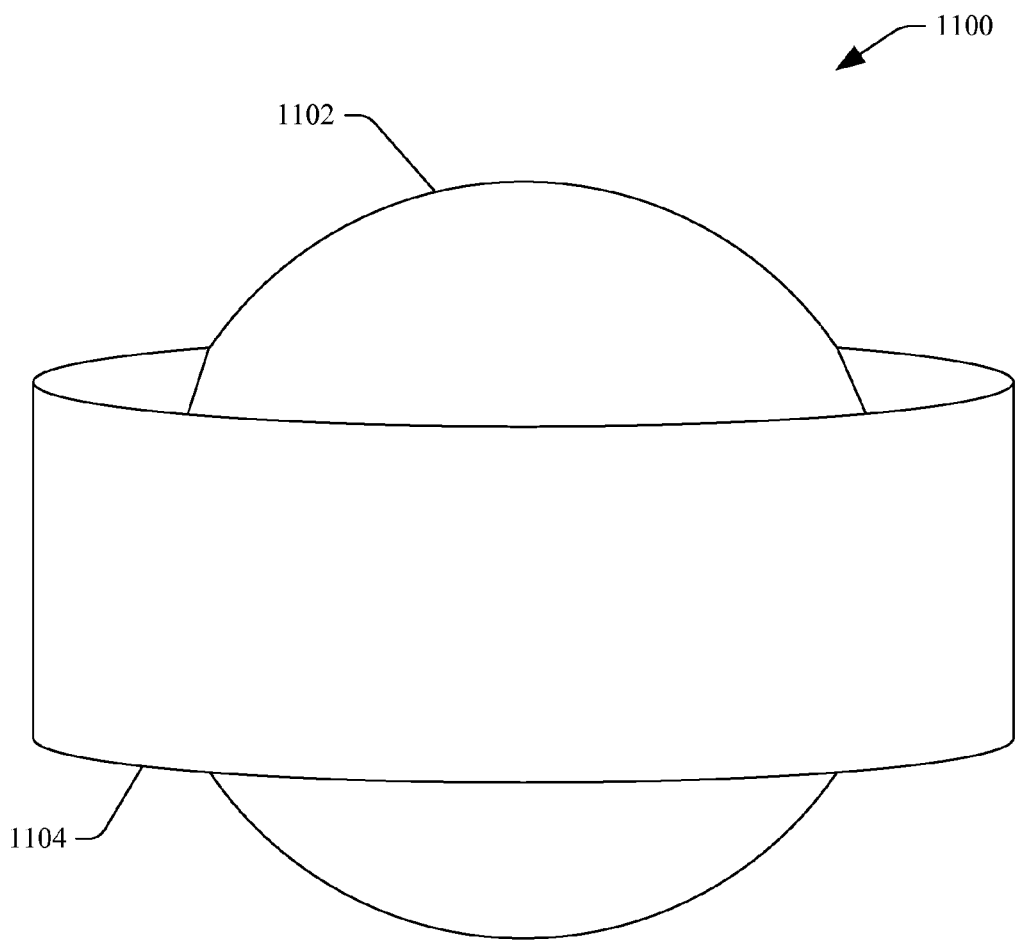
FIG. 11 is an example projection of a cylindrical graphical object onto a computer-implemented representation of a sphere.

Turning now to FIG. 11, another example manner 1100 of projecting graphical images onto spherical display is illustrated. In some instances it may be desired to perform a cylindrical projection—for example, when a 360 degree camera, video camera, or the like is employed. A representation of a sphere 1102 can be surrounded by a cylindrical graphical object 1104. Such graphical object may then be projected onto the sphere 1102. The projection can be similar to that described above, or can be directed toward a center of the sphere 1102. As described above, the sphere 1102 may then be rotated about different axes to place the graphical object in a desired position with respect to the sphere 1102.

Figure 12:
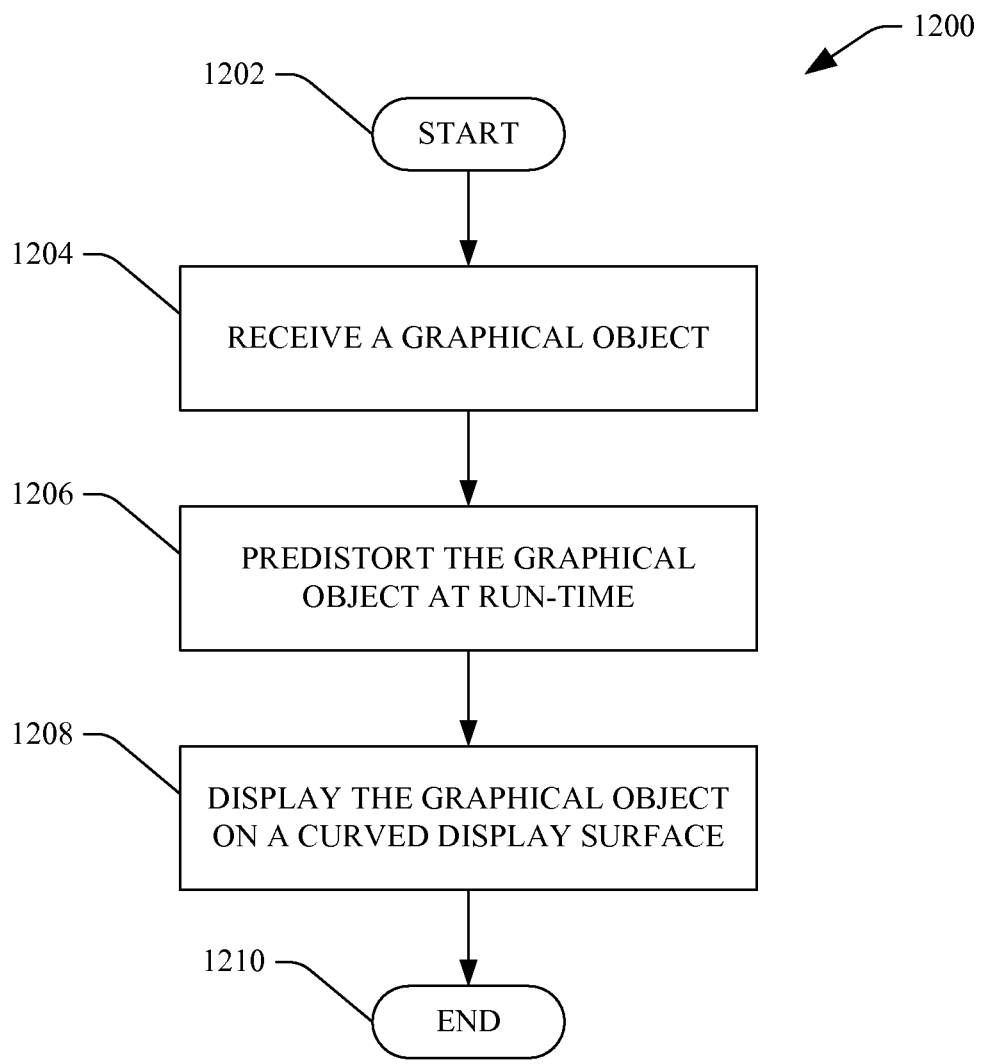
FIG. 12 is a flow diagram of an example methodology for projecting a graphical object onto an irregularly shaped display.
Figure 13:
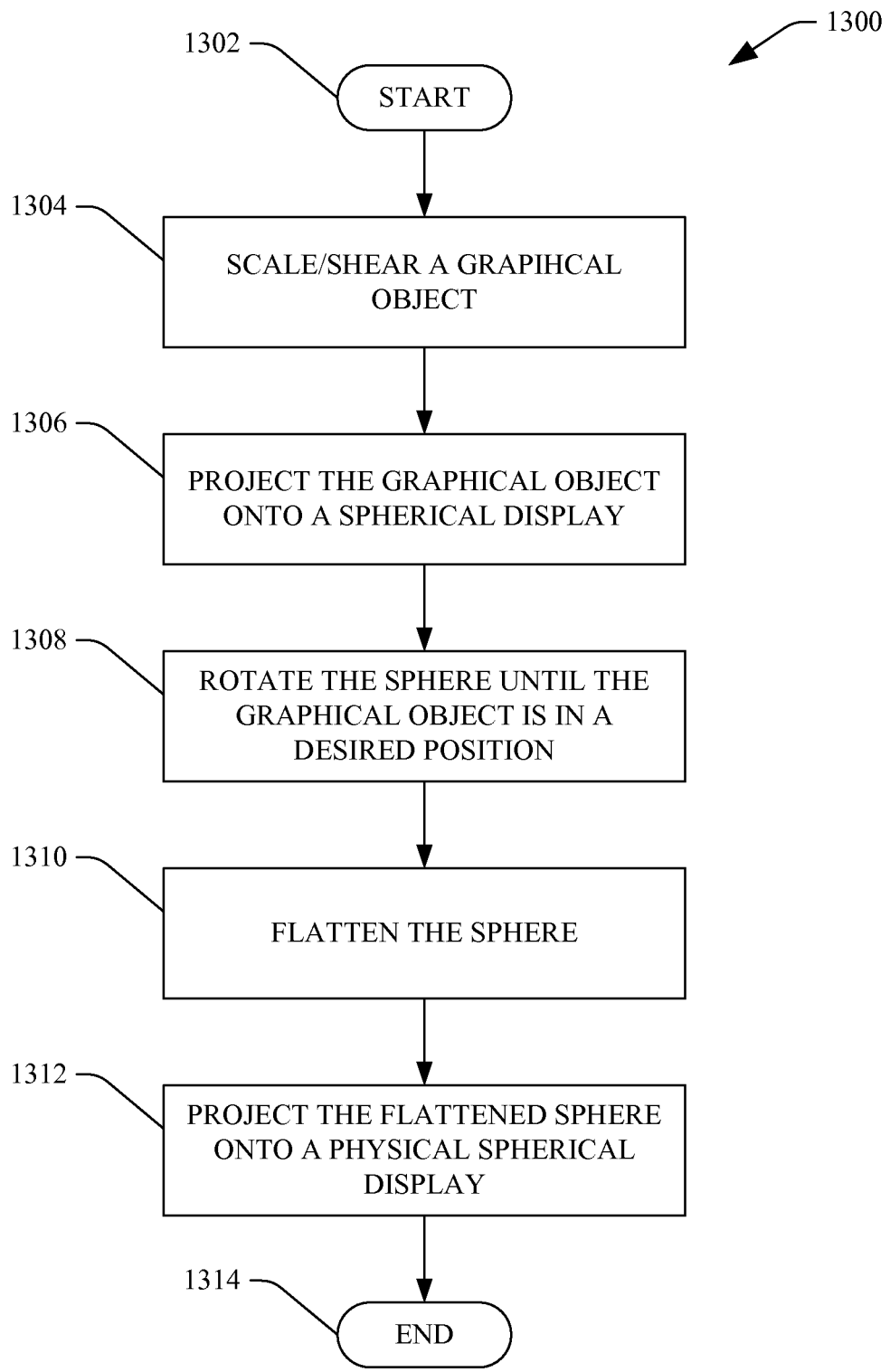
FIG. 13 is a flow diagram of an example methodology for projecting a graphical object onto an irregularly shaped display.
Figure 14:
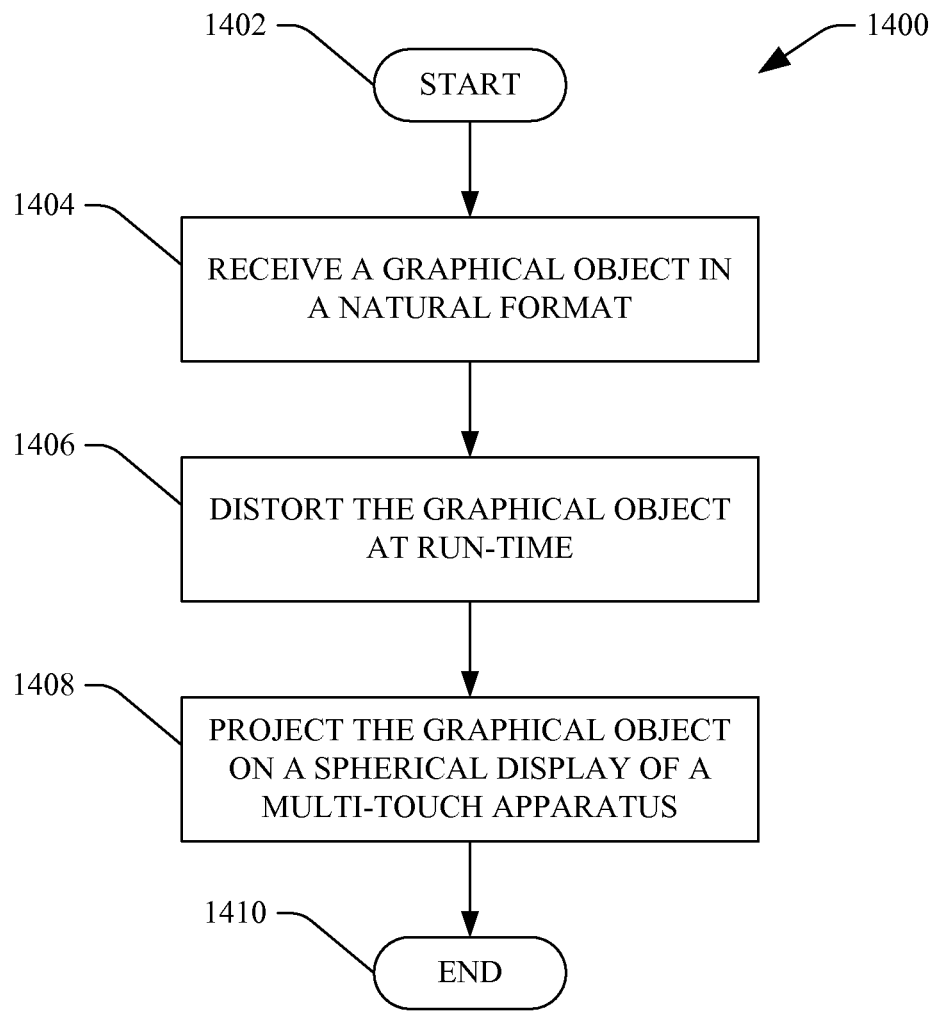
FIG. 14 is a flow diagram of an example methodology for projecting a graphical object onto an irregularly shaped display.

With reference now to FIGS. 12-14, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring specifically to FIG. 12, a methodology for displaying graphical objects on an irregular display surface is illustrated. The methodology 1200 starts at 1202, and at 1204 a graphical object is received. For instance, the curved display surface may be a substantially spherical display surface.

At 1206, the graphical image is pre-distorted at run-time. For example, such pre-distortion may include acts of scaling/shearing, projecting, rotating, and flattening as described herein. The graphical object is pre-distorted such that an appearance of the graphical object on the curved display surface to a user will be substantially similar regardless of a position of the graphical object on the curved display surface when viewed from a viewing axis that is approximately orthogonal to a plane that is tangential to the curved display surface at approximately the center of the graphical object when displayed.

At 1208, the graphical object is displayed on the curved display surface. The methodology 1200 completes at 1210.

The methodology 1200, for instance, may be used in a multi-touch interactive environment. Furthermore, multiple graphical objects may be displayed on the curved display surface.

Now referring to FIG. 13, a methodology 1300 for projecting graphical objects on a spherical display is illustrated. The methodology 1300, for instance, can be undertaken at run-time of an application that is being employed in an interactive multi-touch environment.

The methodology 1300 starts at 1302, and at 1304 a graphical object that is desirably displayed on a substantially spherical display is scaled or sheared. For instance, the graphical object may be planar in nature, and may be scaled with respect to a representation of a sphere that is in memory. In another example, the graphical object may be sheared.

At 1306, the scaled/sheared graphical object is projected onto the representation of the sphere in memory. At 1308, the representation of the sphere is rotated in memory around one or more axes to place the graphical object on a desired position of the representation of the sphere.

At 1310, the representation of the sphere and the graphical object are flattened. For instance, coordinates of the representation of the sphere and the graphical object are mapped to a coordinate system used by a projector. The act 1310 can involve transforming a particular vertex of a tessellated graphical object from a 3-dimensional coordinate on the representation of the sphere to a two-dimensional location on a rendered image that can then be displayed by a projector.

At 1312, the flattened sphere is projected onto a physical spherical display. The methodology 1300 then completes at 1314.

Now referring to FIG. 14, a methodology 1400 that facilitates projecting a graphical object on a spherical display is illustrated. The methodology 1400 starts at 1402, and at 1404 a graphical object is received in a natural format. For instance, the graphical object may be a planar object, such as a photograph, a video, text, etc. and may be associated with a two-dimensional coordinate system. In another example, the graphical object may be a three-dimensional object (e.g., defined in Cartesian coordinates) that is desirably projected onto the spherical display.

At 1406, the graphical object is distorted at run-time of an application used in an interactive multi-touch environment.

At 1408, the graphical object is projected on a spherical display of a multi-touch apparatus. The methodology 1400 then completes at 1410.

Figure 15:
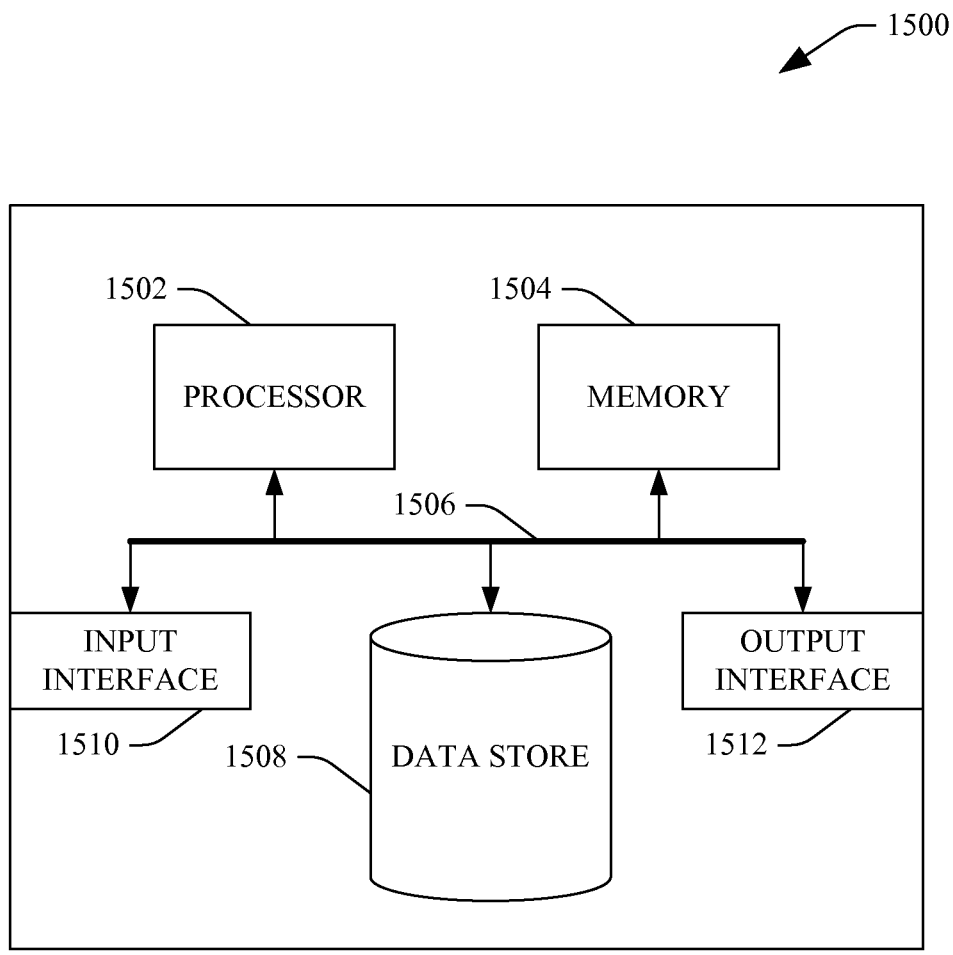
FIG. 15 is an example computing system.

Now referring to FIG. 15, a high-level illustration of an example computing device 1500 that can be used in accordance with the systems and methodologies disclosed herein is illustrated. For instance, the computing device 1500 may be used in an interactive multi-touch environment. In another example, the computing device 1500 may be a portion of a three-dimensional graphics framework. The computing device 1500 includes at least one processor 1502 that executes instructions that are stored in a memory 1504. The instructions may be, for instance, instructions for implementing functionality described as being carried out by one or more components discussed above or instructions for implementing one or more of the methods described above. The processor 1502 may access the memory by way of a system bus 1506. In addition to storing executable instructions, the memory 1504 may also store graphical objects, such as text strings, photographs, videos, etc.

The computing device 1500 additionally includes a data store 1508 that is accessible by the processor 1502 by way of the system bus 1506. The data store 1508 may include executable instructions, graphical objects, such as photographs, videos, text strings, etc. The computing device 1500 also includes an input interface 1510 that allows external devices to communicate with the computing device 1500. For instance, the input interface 1510 may be used to receive graphical objects, commands from users, etc. The computing device 1500 also includes an output interface 1512 that interfaces the computing device 1500 with one or more external devices. For example, the computing device 1500 may display graphical objects by way of the output interface 1512.

Additionally, while illustrated as a single system, it is to be understood that the computing device 1500 may be a distributed system. Thus, for instance, several devices may be in communication by way of a network connection and may collectively perform tasks described as being performed by the computing device 1500.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system that facilitates projecting images onto an exterior surface of a diffuse curved display, the diffuse curved display defining an interior region, the system comprising:
a processor; and
a memory, the memory comprising a plurality of components that are executed by the processor, the components comprising:
a receiver component that receives a graphical object that is to be displayed on the exterior surface of the diffuse curved display in a multi-touch interactive environment, the graphical object formatted for display on a two-dimensional display surface;
a distorter component that distorts the graphical object at run-time of an application that uses the graphical object, the distorter component distorts the graphical object for display on the exterior surface of the diffuse curved display; and a detector component that detects a position on the exterior surface that a member is in physical contact with the exterior surface of the diffuse curved display, the detector component detecting the position of the member based upon an image captured by the detector component, the image depicting light emitted from the interior region by an emitter, that has passed through the diffuse curved display and been reflected from the member back through the diffuse curved display, wherein the distorter component distorts the graphical object for display on the exterior surface of the diffuse curved display based at least in part upon the detected position.

2. The system of claim 1, further comprising a projector that projects the at least one graphical object onto the exterior surface of the diffuse curved display.

3. The system of claim 2, wherein the diffuse curved display comprises an interior surface, and wherein the projector causes the graphical object to be displayed on the exterior surface of the diffuse curved display by having visible light initially contact the interior surface of the diffuse curved display.

4. The system of claim 2, further comprising the emitter, the light emitted by the emitter being infrared light.

5. The system of claim 1, wherein the diffuse curved display is a spherical display.

6. The system of claim 1, wherein the graphical object is one of a planar graphical object or a three-dimensional graphical object.

7. The system of claim 1, wherein the diffuse curved display is spherical, and the components further comprising:
a scaler component that determines a desired scale of the graphical object with respect to a representation of a sphere;
an orientor component that determines a desired orientation of the graphical object with respect to the representation of the sphere; and
a position determiner component that determines a position on the representation of the sphere that corresponds to where the graphical object is desirably displayed on the curved display surface, wherein the distorter component distorts the graphical object at run-time of the application that uses the graphical object based at least in part upon the determined scale, the determined orientation, and the determined position.

8. The system of claim 7, the components further comprising:
an illuminator component that orients the graphical object in accordance with the desired orientation of the graphical object on the representation of the sphere;
a projector component that projects the graphical object onto the representation of the sphere;
a rotator component that rotates the representation of the sphere until the graphical object is at the desired position; and
a flattener component that flattens the computer-implemented display surface onto a projection disk that is to be projected on the exterior surface of the diffuse curved display by a projector.

9. The system of claim 1, wherein the detector component detects multiple positions of multiple members of the user in physical contact with the exterior surface of the diffuse curved display, and wherein the distorter component distorts the graphical object for display on the exterior surface of the diffuse curved display based at least in part upon the detected multiple positions.

10. The system of claim 1, wherein the graphical object is a portion of a larger graphical object that includes multiple graphical objects, and wherein the distorter component distorts each of the graphical objects in the larger graphical object at runtime of the application.

11. A method for displaying images on an exterior surface of a diffuse curved display, the diffuse curved display defining an interior region, the method comprising:
receiving a graphical object that is formatted for display on a two-dimensional display;
at run time of an application that desirably displays the graphical object, distorting the graphical object for display on the exterior surface of the diffuse curved display, wherein distorting the graphical object comprises causing an appearance of the graphical object on the exterior surface of the diffuse curved display to be identical regardless of a position of the graphical object on the exterior surface of the diffuse curved display when viewed at a viewing axis that is orthogonal to a plane that is tangential to the diffuse curved display at a center of the graphical object;
displaying the graphical object on the curved display surface;
detecting a location on the exterior surface of the diffuse curved display where a member is in contact with the exterior surface of the diffuse curved display, the detecting comprising:
emitting infrared light from the interior region, the infrared light passes through the diffuse curved display; and
receiving an image of an interior surface of the diffuse curved display, the image comprising a portion where the infrared light has reflected from the member back through the diffuse curved display;
receiving user input by way of the member coming into contact with the exterior surface of the diffuse curved display;
receiving user input by way of a second member coming into contact with the exterior surface of the diffuse curved display simultaneously with the member coming into contact with the exterior surface of the diffuse curved display; and
displaying the graphical object on the exterior surface of the diffuse curved display based at least in part upon a position of the member on the exterior surface of the diffuse curved display and a position of the second member on the exterior surface of the diffuse curved display.

12. The method of claim 11, wherein the graphical object is rectangular, and wherein the graphical object is distorted such that lines of the graphical object appear to be straight on the exterior surface of the diffuse curved display when viewed at a viewing axis that is approximately orthogonal to a plane that is tangential to the exterior surface of the diffuse curved display at the center of the graphical object.

13. The method of claim 11, wherein the graphical object is tessellated.

14. The method of claim 11, wherein the graphical object comprises text.

15. The method of claim 11, wherein the diffuse curved display is a spherical display, and wherein the act of distorting comprises:
determining a scale of the graphical object with respect to a representation of a sphere;

determining a desired orientation of the graphical object with respect to the representation of the sphere;

determining a desired position of the graphical object with respect to the representation of the sphere;

orienting the graphical object with respect to the representation of the sphere such that a center of the graphical object corresponds to a pole of the representation of the sphere;

projecting the graphical object onto the representation of the sphere;

rotating the representation of the sphere such that the graphical object is positioned in accordance with the desired position; and flattening the spherical representation and the graphical object onto a disk that is to be projected onto the spherical display.

16. The method of claim 11, wherein the graphical object is a portion of a larger graphical object that includes several other graphical objects, and wherein the acts of distorting and displaying are performed for each of the graphical objects in the larger graphical object.

17. The method of claim 11, wherein the diffuse curved display comprises an interior surface, and wherein the graphical object is displayed on the exterior surface of the diffuse curved display by projecting light onto the interior surface of the diffuse curved display.

18. The method of claim 11, further comprising:

emitting infrared light through the diffuse curved display;

detecting infrared light reflected from the member back through the diffuse curved display; and detecting that the member has come into contact with the exterior surface of the diffuse curved display based at least in part upon the detecting that the infrared light has reflected from the member.

19. A display apparatus comprising a computer-readable memory, the memory comprising instructions that, when executed by a processor, cause the processor to perform acts comprising:

executing an application retained in the computer-readable memory, the application configured to display graphical objects on a two-dimensional display screen;

receiving, from the application, a graphical object that is to be displayed on an exterior surface of a diffuse spherical display in a multi-touch interactive environment, the graphical object formatted for display on the two-dimensional display screen;

distorting the graphical object at run-time of the application such that the graphical object is formatted for display on the exterior surface of the diffuse spherical display; and detecting a position on the exterior surface of the diffuse spherical display that a member is in physical contact with the exterior surface of the diffuse spherical display, the graphical object is distorted for display based at least in part upon the position, and wherein detecting the position of the member comprises:

receiving an infrared image of an interior surface of the diffuse spherical display, the infrared image comprising a portion corresponding to a location on the exterior surface of the diffuse spherical display where the member is in physical contact with the exterior surface of the diffuse spherical display, the portion indicating where infrared light emitted by an emitter, has passed through the diffuse spherical display and been reflected from the member back through the diffuse spherical display.

20. The display apparatus of claim 19, the acts further comprising:

detecting a second position on the exterior surface of the diffuse spherical display that a second member is in physical contact with the exterior surface of the diffuse spherical display, the member and the second member simultaneously being in physical contact with the exterior surface of the diffuse spherical display; and distorting the graphical object for display on the exterior surface of the diffuse spherical display based at least in part upon the position of the member on the exterior surface of the diffuse spherical display and the second position of the second member on the exterior surface of the diffuse spherical display.

* * * * *